United States Patent [19]

Doerges

[11] 4,155,985

[45] May 22, 1979

[54] PROCESS OF PURIFYING GASES

[75] Inventor: Alexander Doerges, Frankfurt am Main, Fed. Rep. of Germany

[73] Assignee: Metallgesellschaft Aktiengesellschaft, Frankfurt am Main, Fed. Rep. of Germany

[21] Appl. No.: 876,957

[22] Filed: Feb. 13, 1978

[30] Foreign Application Priority Data

Feb. 14, 1977 [DE] Fed. Rep. of Germany ....... 2706152

[51] Int. Cl.² ............................................ B01D 47/00
[52] U.S. Cl. .................................. 423/210; 423/236; 423/366; 48/215
[58] Field of Search .................. 423/210 M, 236, 366, 423/415 A; 55/72; 48/215

[56] References Cited

U.S. PATENT DOCUMENTS

| | | | |
|---|---|---|---|
| 1,924,206 | 8/1933 | Hansen | 423/236 |
| 2,008,253 | 7/1935 | Klempt | 423/366 |
| 3,069,251 | 12/1962 | Eastman et al. | 423/415 A |
| 3,780,163 | 12/1973 | Callighan | 423/210 |
| 3,855,390 | 12/1974 | Matumoto et al. | 423/236 |
| 3,951,790 | 4/1976 | Fujisawa et al. | 55/72 |

*Primary Examiner*—G. O. Peters
*Attorney, Agent, or Firm*—Sprung, Felfe, Horn, Lynch & Kramer

[57] ABSTRACT

A process for the removal of hydrogen cyanide and of metals which form carbonyls from gases produced by partial oxidation of hydrocarbons with steam and oxygen is described involving use of an alkaline solution containing a carbonyl inhibitor in the scrubber.

3 Claims, No Drawings

PROCESS OF PURIFYING GASES

BACKGROUND OF THE INVENTION

1. Field of the Invention

This invention relates to a process of purifying gases which are produced by a partial oxidation of hydrocarbons by a treatment with steam and oxygen under pressure at temperatures of 1200° to 1500° C., comprising cooling the gases and scrubbing them to remove solid impurities. This invention especially relates to removal of metals which form carbonyls.

2. Discussion of the Prior Art

It is known to gasify solid or liquid fuels by a treatment with steam and oxygen under a pressure of 60 kg/cm² absolute pressure and a temperature of 1500° C. in order to produce a raw gas which consists mainly of hydrogen and carbon monoxide and may be used, e.g., for the synthesis of methanol. For purification, the raw gas is first cooled and freed from condensate, carbon black and water, and subsequently scrubbed with methanol at a temperature of $-10°$ C. to $-30°$ C. and a pressure up to 150 kg/cm² so that sulfur compounds and carbon dioxide are substantially removed. A partial stream of the desulfurized raw gas may be subjected to a shift conversion treatment with steam in order to convert its carbon monoxide content to hydrogen and carbon dioxide and may subsequently be added to the scrubbed gas to adjust the latter to the $CO:H_2$ ratio which is required for methanol synthesis. After a further purification stage, the gas can then be catalytically reacted to methanol (British Patent No. 1,164,407).

A similar process of producing a synthesis gas for the production of ammonia has also been described. In that process, solid or liquid fuel is also gasified by a treatment with oxygen and steam to produce a raw gas, which is purified and is subsequently treated with steam to convert its carbon monoxide content into carbon dioxide and hydrogen. The carbon dioxide is scrubbed off and the resulting high-hydrogen gas is mixed with nitrogen in a ratio of $N_2:3H_2$. The mixture is compressed to a suitable pressure so as to produce a gas which is suitable for the synthesis of ammonia (German Patent No. 1,231,222).

When these and similar processes of producing synthesis gases are carried out in existing plants, trouble is sometimes caused by deposits. To avoid this, the precooled gas must also be freed from sulfide-forming metal compounds and must be cooled further. A removal of hydrogen cyanide is also desired in order to decrease the expenditure involved in the subsequent purification of the gas. In that known process, a part of the metal impurities is inevitably converted to volatile metal carbonyls, which may adversely affect the succeeding gas-purifying plants or the usefulness of the gases for the intended purpose.

It is an object of the invention to avoid these and other disadvantages and to provide a process in which raw gas can be pre-purified in such a manner that after a simple treatment to remove sulfur and part of the carbon dioxide they can be used for a synthesis of chemical compounds, such as methanol and ammonia.

Specifically, the novel process is intended to prevent a formation of metal carbonyls in the gas, also to remove hydrogen cyanide, and to produce a gas which is free from these poison and can be processed further without trouble and is free from substances which tend to deteriorate catalysts used for such further processing.

SUMMARY OF THE INVENTION

This object is accomplished according to the invention in that a removal of metal compounds having carbonyl-forming metallic constituents, is effected in that the gas is cooled to temperatures of 20°–150° C. and is scrubbed at temperatures of 10°–80° C. with an aqueous alkaline solution which contains one or more chemical compounds which prevent a formation of carbonyls the solid impurities are removed entirely or in part from the scrubbing liquor, which has been diluted by condensate formed from the gas, and the scrubbing liquor which has been purified entirely or in part is recycled to the scrubber.

Within the scope of the invention, the solution is preferably adjusted to a pH value of 7.1–10.

The pH value may be adjusted with ammonia, with alkaline metal compounds, such as NaOH or KOH, or with organic amines having an alkaline reaction. If the gas contains alkaline components, such as $NH_3$, the addition of alkaline compounds may be correspondingly limited.

According to a preferred feature of the invention, the solution contains polysulfides as chemical compounds which prevent the formation of carbonyls Within the scope of the invention, the solution may also contain hydrazine as a chemical compound which prevents a formation of carbonyls.

According to a preferred feature of the invention, chemical compounds which prevent a formation of carbonyls are contained in the inflowing solution in an amount of at least one mole per mole of carbonyl-forming metal to be removed.

The advantages afforded by the invention reside particularly in that gases, particularly gases produced by a partial oxidation of fuels by a treatment with steam and oxygen under pressure and at high temperatures, can be purified in such a manner that the purified gases are suitable for further chemical reactions, such as the synthesis of methanol or ammonia. The process according to the invention enables a trouble free purification of gases to a high purity in such a manner that deposits in various parts of the plant are avoided. Specifically, the process according to the invention simultaneously prevents a formation of metal carbonyls.

The process is simple and straightforward. It is highly economical because extraneous chemicals are required only in a small quantity.

EXAMPLE

At a rate of 150,000 standard m³/h, a gas produced by a gasification of heavy residue oil by a treatment with oxygen and steam at a pressure of 55 bars and a temperature of 1400° C. is precooled to 120° C. and fed to a scrubber. Based on dry matter, the gas has the following composition in percent by volume:

| | |
|---|---|
| $CO_2$ | 4.1 |
| CO | 48.43 |
| $H_2$ | 45.4 |
| $H_2S$ | 1.3 |
| COS | 0.05 |
| $CH_4$ | 0.50 |
| $N_2$ | 0.12 |
| Ar | 0.10 |
| | 100.00 |

The gas also contains 0.03 kg steam per standard m³, as well as entrained inorganic residual dust from the feedstock and about 50 mg carbon black per standard m³, 60 mg HCN per standard m³, 10 mg $NH_3$ per standard m³, and, in small concentrations of 1–10 mg per standard m³, volatilized carbonyl-forming metals, such as nickel and iron.

The gas is intended to be used for the synthesis of, e.g., methanol and ammonia and for this purpose is to be purified to remove water, sulfur compounds, ammonia, HCN and part of $CO_2$.

To preclude trouble due to deposits, the precooled gas must be treated to remove dust and carbon black as well as sulfide-forming metal compounds and must be cooled further. In order to decrease the expenditure in the gas-purifying plant, a previous removal of HCN is also desired. For this purpose the pre-cooled gas is, in accordance with the invention, fed to a scrubber and is scrubbed therein with an aqueous alkaline polysulfide solution flowing in a countercurrent and recirculated in the lower portion of the scrubber. This polysulfide solution is fed to the scrubber at its top at a rate of 50 m³/h and at a temperature of 33° C. and contains per liter 2 grams $NH_3$, 0.5 gram $CO_2/l$, 0.4 gram $H_2S$, 0.5 g sulfur in the form of dissolved polysulfide and 0.15 g rhodanide (SCN). In the scrubber, the solution takes up carbon black, residual dust from the gasification process, inclusive of carbonyl-forming metal compounds, such as iron compounds and nickel compounds, as well as HCN, $NH_3$, $H_2S$ and $CO_2$. Nickel plus iron are removed in a total amount of 0.005 gram mole per liter of polysulfide solution. The effluent gas is free from nickel and HCN and is cooled in known manner to remove most of the residual steam content and is then fed to a gas-purifying plant for the removal of residual water, sulfur compounds, $NH_3$ and part of $CO_2$.

The solution which leaves the scrubber contains suspended carbon black, residual dust from the gasification process, and metal sulfides, particularly iron sulfide and nickel sulfide. Dissolved rhodanide has been formed from HCN. The content of dissolved polysulfide sulfur is now less than 0.1 gram S per liter. On the other hand, the solution contains suspended nickel sulfide plus iron sulfide in a total of 0.005 gram mole per liter. It is apparent that the polysulfide solution fed to the scrubber contained 3.1 moles of polysulfide sulfur per mole of carbonyl-forming metal to be taken up. The effluent solution contains less than 0.6 mole polysulfide sulfur per mole of carbonyl-forming metal. The turbid solution is processed to remove carbon black, carbonyl-forming metal compounds and rhodanide. A quantity corresponding to the quantity of water which has been condensed from the gas is then removed from the solution. The remaining solution at a rate of 50 m³/h is adjusted to a content of 0.5 gram polysulfide sulfur per liter and to a pH value of 9.5 in that sulfur and ammonia are dissolved in the solution or concentrated ammonium polysulfide solution are added thereto. The adjusted solution is fed to the scrubber at 33° C. The pH value is measured at 20° C. and 1 bar.

The gas which has thus been purified is suitable for further processing, particularly for a synthesis of methanol and ammonia.

Particularly contemplated polysulfides include: inorganic polysulfides, particularly ammonium polysulfide, sodium polysulfide and potassium polysulfide.

What is claimed is:

1. In a process for purifying a gas containing metal compounds capable of forming metal carbonyl compounds which gas has been produced by partial oxidation of a hydrocarbon in the presence of steam and oxygen under pressure at a temperature of 1200° to 1500° C. by cooling the gas and scrubbing the same to remove solid impurities, the improvement for the removal of said metal compounds which comprises cooling the gases to a temperature of 20°–150° C. and scrubbing the same at a temperature of 10°–80° C. with an aqueous alkaline solution having a pH of 7.1 to 10 containing at least one chemical compound from the group of hydrazine and inorganic polysulfides which prevents formation of carbonyls, removing at least a portion of solid impurities from the resultant scrubbing liquid, and recycling the scrubbing liquid to the scrubbing process.

2. A process according to claim 1 wherein said solution contains hydrazine as the chemical compound which prevents carbonyl formation.

3. A process according to claim 1 wherein the compound preventing carbonyl formation is introduced into said solution in an amount of at least one mole per mole of carbonyl-forming metal.

* * * * *